Dec. 18, 1923.　　　　1,478,335
C. J. HUDSON ET AL
METHOD OF AND APPARATUS FOR GRADING
Filed Feb. 1, 1919　　2 Sheets-Sheet 1

WITNESS
Roswell F. Hatch

INVENTORS
CHARLES J. HUDSON
WILSON C. BROGA
BY
Clayton L. Jenks
ATTORNEY

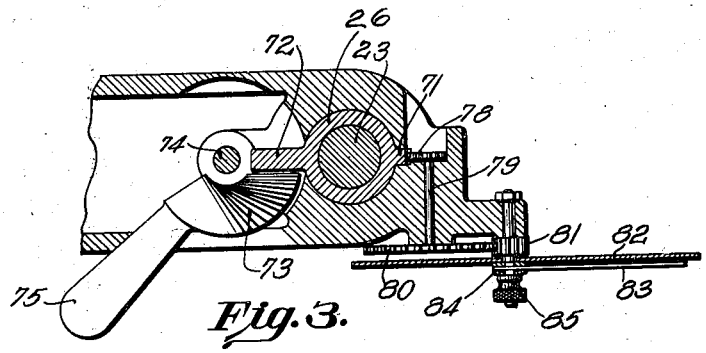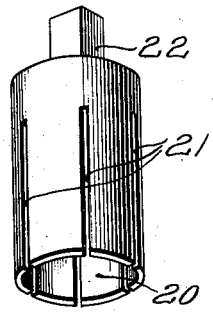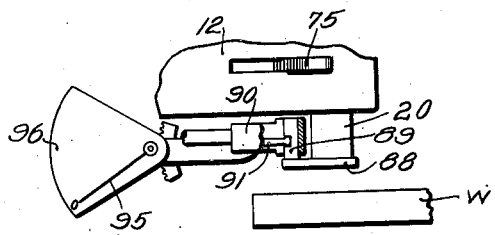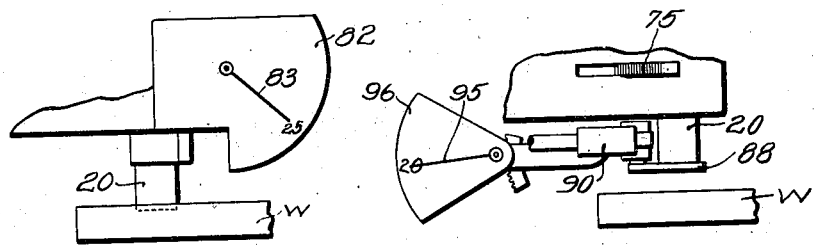

Patented Dec. 18, 1923.

1,478,335

UNITED STATES PATENT OFFICE.

CHARLES J. HUDSON AND WILSON C. BROGA, OF WORCESTER, MASSACHUSETTS, ASSIGNORS TO NORTON COMPANY, OF WORCESTER, MASSACHUSETTS, A CORPORATION OF MASSACHUSETTS.

METHOD OF AND APPARATUS FOR GRADING.

Application filed February 1, 1919. Serial No. 274,507.

*To all whom it may concern:*

Be it known that we, CHARLES J. HUDSON and WILSON C. BROGA, citizens of the United States of America, residing at Worcester, in the county of Worcester and State of Massachusetts, have invented certain new and useful Improvements in Methods of and Apparatus for Grading, of which the following is a full, clear, and exact specification.

This invention relates to a method of grading abrasive wheels and similar articles and to apparatus for practicing the method.

Modern grinding requirements necessitate using abrasive wheels of uniform characteristics for a given type of work. To insure such uniformity, the manufacturer must compare each wheel, as it comes from process, with a set of standards and mark it with an index character to indicate its position in a comparative scale and so determine whether it comes within the terms of the particular order on which it was made.

The utility of a wheel for any certain kind of work is determined largely by two predominating factors, i. e. the wheel life and the rate of cutting the work. The wheel best adapted for a given type of operation should remove the maximum amount of material for a reasonable amount of wear of the wheel itself. While these two factors depend upon many characteristics of the wheel, it may be considered that wheel life or wear is a function of or varies with the strength of the wheel bond. The grinding ability of the wheel, as determined by the amount of material cut away from the work, is varied by changes in the size of the abrasive grain and the nature and strength of the bond.

Absolute measurements of the wheel wear and the material removed have not heretofore been considered to constitute a feasible basis for a grading system which requires a rapid analysis and what may be termed an instantaneous judgment of the characteristics of a large number of wheels in a short time; hence grading has been imperfectly carried on by considering but one of these functions: i. e. the wheel wear as indicated by observations of the strength of the bonded wheel structure. This wheel strength has been determined by measuring the penetration of a cutting tool, shaped like a screwdriver, mechanically applied under a constant force, or, when the operation is performed by hand, by noting the "feel" or resistance of the tool as it is forced into the wheel by a twisting movement.

It sometimes happens that the machine operated tool will be so placed against the wheel that one of the abrasive particles will be in the way and form a pivot on which the tool turns, thereby preventing it from engaging the other grains and crushing the wheel structure unless sufficient pressure is exerted to crush the bond supporting the pivotal grain. This of course gives a false indication of the bond strength to the operator. For this and other reasons, the determination of the grade of the wheel has been left largely to the skill of the hand operator, and long experience has been required for attaining even a moderate degree of skill in determining grade.

It is accordingly an object of our invention to provide a method of and apparatus for grading which will give more accurate determinations of the characteristics of an abrasive article than heretofore attainable and to utilize in a grading system comparative observations of the abrading ability of the article and that of a set of standards, as indicated by the wear produced upon a tool during the grading operation, and to coordinate therewith data which is a function of the strength of the wheel structure.

A further object of the invention is to provide a new and improved tool for grading wheels which will obviate the difficulty hereinbefore recited of pivoting on a projecting grain and so failing to engage the cutting surface of the wheel and thus give a proper indication of the characteristics of the wheel.

In the drawings:

Fig. 3 is a section on the line 3—3 of Fig. 1;

Fig. 4 is a detail in perspective showing the preferred embodiment of the grading tool which may be used in the illustrated apparatus; and Figs. 5, 6 and 7 are diagrammatic views which, taken with Fig. 1, illustrate various steps in the practice of our improved method.

Figure 1:
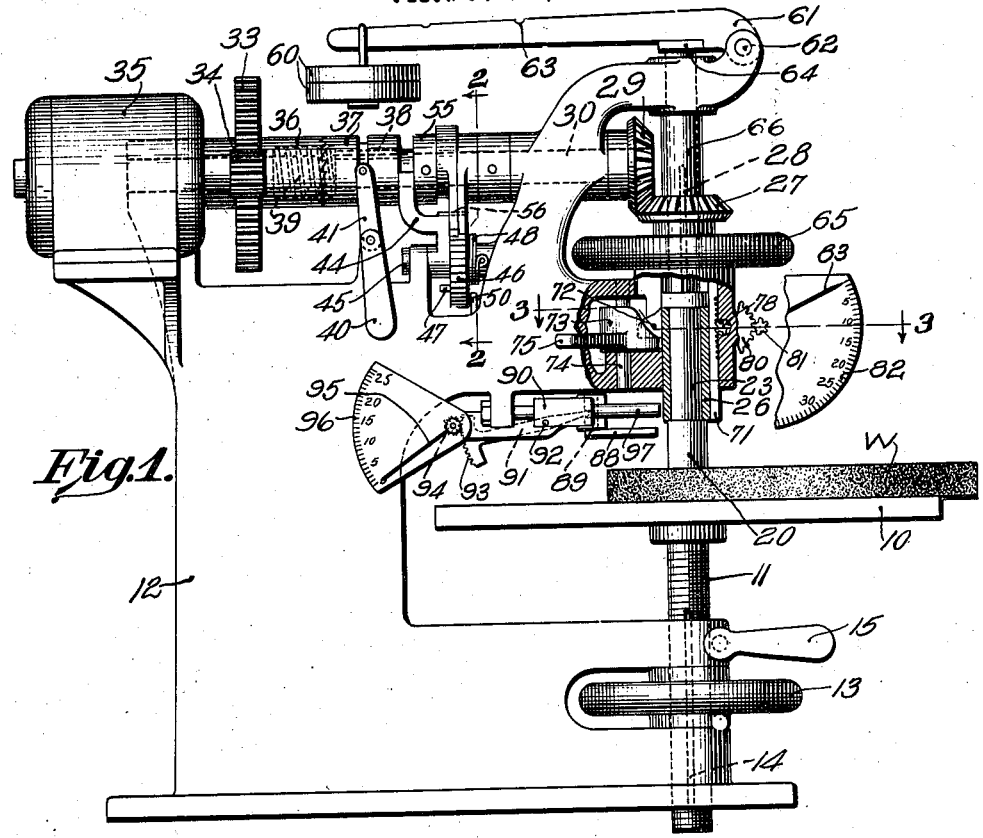
Fig. 1 is an elevation, certain parts being broken away, of one form of grading machine by which the herein described method may be practiced.

As a specific application of our invention, we propose to grade grinding wheels and other articles containing abrasive material by comparing them with a set of standards of known characteristics and to index them according to the wear of a tool and preferably to coordinate this data with measurements indicating the wheel strength, as obtained when a suitable tool is forced into the article under a constant pressure for a definite period of time or a predetermined number of movements relative to the article being graded. This method is preferably accomplished by rotating a cutting tool under a constant load of weights for a given number of turns or for a definite time at a uniform velocity. The depth of penetration and the decrease in length of the tool are then measured, and by comparison with similar values obtained with standards, the given article may be marked as being of a certain grade, which is represented either in absolute figures or as an arbitrary value comparable with one of the standards. This method will be more readily understood from the following description of a simple form of device adapted to carry out this method, which comprises a support for an abrasive wheel, a tool rotated against the wheel under a constant pressure and for a definite number of turns and indicating mechanism by which the depth of penetration of the tool into the wheel and the decrease in length of the tool may be determined.

As illustrated in the drawings the work support or table 10 is preferably made adjustable toward and from the tool, in order to accommodate wheels of varying thicknesses. For this purpose the table is provided with a rigidly mounted screw-threaded post 11, which passes through a clearance hole in the machine frame 12 and which is movable vertically therein by a hand wheel 13 embraced between two projecting arms of the frame. The table is held from rotation, when the hand wheel 13 is turned to adjust its vertical position, by a key 14 which engages a spline in the post 11. The table is locked in adjusted position by a hand lever 15 adapted to clamp the split end of the upper arm of the frame 12 upon the post 11.

The cutting or grading tool 20 may be of any desired shape and material, but we prefer to employ the tool shown in Fig. 4, in which the tool has no contact with the work at the intersection of the axis of rotation of the tool and the surface of the work. The tool may be conveniently made from a cylindrical tube having the longitudinal center of the tube coincident with the axis of rotation of the tool. It is obvious that the difficulty hereinbefore recited of having the tool pivot on a projecting abrasive particle is impossible with the tool shown, in which the central portion of the tool which would be engaged by any such particle has been removed. It is necessary, in order that the wear of the tool may be measurable, that the tool shall be of a more or less easily wearable material varying in accordance with the character of the series of wheels being graded. The degree of wear desired in the tool may be secured not only by selecting a suitable material for the tool but also by varying the duration of the abrasive action on the tool. Since the amount of linear wear on the tool also varies in accordance with the area of the tool engaged by the wheel, we propose to shape and proportion the walls of the tool to give a suitable size of hole and outside diameter to suit the particular requirements of any operation. For certain classes of work it may be desirable to provide the walls of the tool with a series of slots 21 (Fig. 4) which may extend parallel to the axis or may be inclined so as to follow a helical path around the tool to permit the escape of the crushed particles of the wheel from below the tool.

The tool is secured by any desired means as, for example, the square post 22 to the lower end of a shaft 23. In order to secure an abrading action, the shaft is mounted for rotation and is preferably connected with a source of power in order to secure a more uniform action than would be obtained by hand operation. It is desirable that means be provided for automatically determining the extent of the action of the tool on the wheel in order that uniform conditions may prevail on all tests. This may be limited by measuring the time of action or by counting the number of rotations of the tool while in contact with the wheel. In the illustrated embodiment of the invention, we provide a counting mechanism which automatically stops the action of the tool after a predetermined number of rotations thereof. The shaft 23 is mounted for rotation in a sleeve 26 which is in turn slidably mounted in the machine frame. The upper end of the shaft is provided with a pinion 27 held from rotation thereon by a key and spline indicated at 28, which does not prevent the longitudinal movement of the shaft through the pinion. The pinion 27 is driven by a second pinion 29 fixed on the end of a horizontal shaft 30 mounted in suitable bearings on the upper part of the machine frame. The left end of the shaft 30 has loosely mounted thereon a gear 33 which is driven by a pinion 34 mounted on the shaft of a motor 35.

In order that the motor may be at times operatively connected with the tool, a clutch is provided and for the purpose of limiting the duration of the operation of the grading tool on the wheel, a counting mechanism may be employed to disconnect the clutch, and thus stop the rotation of the tool 20. A convenient form of clutch is shown in Fig. 1, in which the projecting hub 36 of the gear 33 forms one member of a clutch, the other member being formed on the end of a sliding sleeve 37, which transmits rotary movement from the gear to the shaft through the agency of a key 38 (shown in dotted lines) which connects the sleeve and the shaft 30. The clutch is held normally in inoperative condition by a spring 39 which is seated in a chamber formed in the adjacent ends of the two clutch members. A handle 40, pivotally mounted on the frame of the machine, is provided with a yoke 41 engaging an annular slot in the sleeve 38, thereby serving for throwing the clutch into driving position. The clutch is held in its operative position by a latch 44 which drops in behind the sleeve 37 when the latter is moved to the left, thereby holding it against the action of the spring 39 until released.

The clutch is unlocked and allowed to return to inoperative position by a counting mechanism which starts to count the rotations of the shaft 30 as soon as the shaft begins to turn. As illustrated in the drawings, the shafts 30 and 23 are connected by bevel gears of equal diameter, i. e. miter gears, which produce one rotation of the shaft 23 for each rotation of the shaft 30. The ratio of the gearing may be changed, however, as desired so that the counting mechanism may be made to control the revolutions of the tool carrying shaft from a fraction of one rotation to a great number of rotations. Any of the well-known forms of counting mechanism may be employed, but for the purpose of illustration we may employ that shown in Figs. 1 and 2.

The latch 44 which is actuated by the counting mechanism to stop the tool is loosely mounted on a stud 45 fixed in the machine frame. A toothed wheel 46 is also loosely mounted on the stud beside the latch 44. The wheel has projecting from the side adjacent to the latch a pin 47 which, when the wheel is turned in a counter-clockwise direction, viewing Fig. 2, strikes the latch 44 and lifts it from behind the sleeve 37, thereby allowing the spring 39 to throw the sleeve to the right (Fig. 1) and stop the rotation of the shaft 30 and, of course, the tool. The wheel 46 is under the action of a spring 48 which urges the wheel in a clockwise direction and so normally tends to keep a stop pin 49 against a pin 50 projecting from the frame of the machine. As soon as the shaft 30 begins to turn, the wheel 46 is moved around one tooth at a time until the pin 47 causes the clutch to be disconnected. The movement of the wheel is produced by two pawls, a feeding pawl 53 and a retaining pawl 54. The feed pawl is mounted on an eccentric hub projecting from a collar 55 rigidly mounted on the shaft 30 while the retaining pawl 54 is loosely mounted on the shaft itself, so that the wheel is advanced one tooth for each revolution of the shaft 30 by the feeding pawl and held in this position by the retaining pawl.

Figure 2:
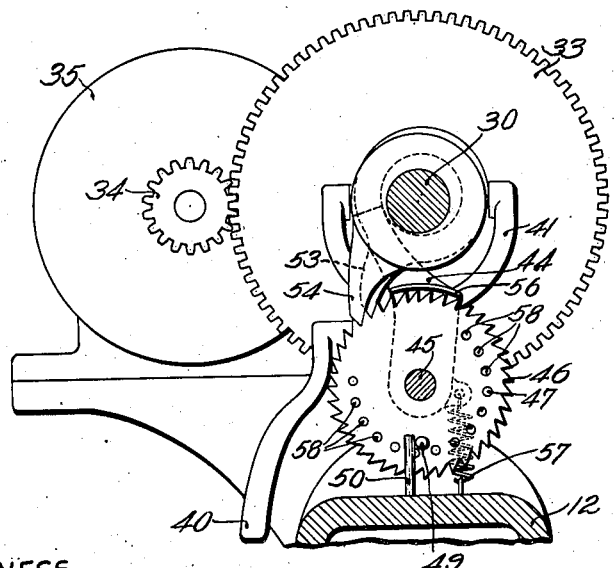
Fig. 2 is a section on the line 2—2 of Fig. 1, showing particularly the mechanism for limiting the duration of the grade determining action on the wheel.

After the wheel 46 has been moved around far enough, the pin 47 strikes the latch 44 and causes it to swing to the left in Fig. 2. This movement causes the latch to be withdrawn from the clutch and at the same time swings a plate 56 carried by the latch underneath the two pawls so as to free them both from engagement with the wheel. The spring 48 now turns the wheel back to its starting position as shown in Fig. 2. A spring 57 holds the latch against the shaft 30 or against the side of the sleeve 37 depending upon whether the clutch is in driving or in stopped position. In order that the time of disengaging the clutch may be varied so as to occur after any predetermined number of rotations of the shaft, the wheel 46 is provided with a series of holes 58, into any one of which the pin 47 may be placed, which of course determines the number of teeth of the wheel 46 which must be moved before the clutch is disengaged.

In order to obtain comparable results in grading a series of similar wheels, the tool should be pressed against the wheel under a constant force. This force may be obtained by the action of gravity on weights which are arranged to exert a downward pressure on the tool. In order to avoid the use of a large number of weights the pressure may be multiplied by the use of a lever as shown in Fig. 1, in which the weights 60 are carried on the end of a lever 61 pivotally mounted at 62 on a projection from the machine frame. The lever may be provided with a series of notches 63 so that the weights may be moved toward and from the fulcrum to vary the pressure applied to the tool. The lever 61 is provided with a hardened steel block 64 which bears upon the rounded upper end of the shaft 23. By this construction the pressure of the tool on the work may be adjusted by varying the number of the weights or by moving them along the lever 61.

Provision is preferably made in the machine for giving the tool a slight preliminary action on the wheel prior to the grading action, in order to secure a uniform surface for the tool to act on and to remove a slight amount from the surface of the wheel so as to insure grading a portion which is representative of the general body of the wheel. This preliminary action may be conveniently performed by hand and for this purpose a hand wheel 65 is rigidly attached to the bevel gear 27 which, as has been described, is keyed to the shaft 23. By this construction the operator may turn the wheel one or two revolutions to seat the tool on the work when the clutch is disengaged. The bevel gear 27 and hand wheel 65 are held downwardly by a sleeve 66 which bears on the top of the bevel gear.

In order that the tool may be raised from the work to a predetermined position to facilitate the removal of the graded wheel and the insertion of a fresh piece of work, and in order to perform certain measuring operations which will be hereinafter described, a convenient means for accomplishing this end may comprise, as shown in Figs. 1 and 3, the sleeve 26 mounted to slide in the machine frame but held from rotation therein by a key 71. On the side of the sleeve opposite the key, there is provided an integral lug 72 which is in position to be engaged by a cam 73 pivotally mounted on a pin 74. The cam is provided with a handle 75 projecting through an opening in the side of the machine frame by which the cam may be turned to engage the lug 72 and lift it to a predetermined position determined by the height of the cam.

The indicating mechanism by which the character of the wheel is made visible may be of the general type of a micrometer measuring device. In order to obtain the depth of penetration of the tool into the wheel and the wear upon the tool it has been found most expedient to employ two indicating devices, one of which shows the combined penetration of the tool into the wheel and the wear on the tool while the other shows the tool wear alone. The penetration may be obtained by subtracting the wear on the tool from the combined wear and penetration. The downward movement of the tool may be conveniently determined by means of such a micrometer indicating device as is shown in Figs. 1 and 3 in which the key 71 is provided with a rack which is engaged by a pinion 78 mounted on the end of a shaft 79, the other end of the shaft being provided with a gear 80 which is in mesh with a pinion 81. This pinion has a projecting shaft which extends through dial 82 and on which is mounted a pointer 83.

It is desirable that the pointer shall be capable of being set to zero, whatever may be the position of the tool and the connecting train of gears. Therefore, the pointer is preferably frictionally mounted on the shaft of the pinion 81 as, for example, by the spring washer 84 which is held against the pointer by a thumb screw 85. The dial 82 is provided with suitable graduations which may conveniently be made to indicate thousandths of an inch. By this construction the pointer may be set at zero on the scale when the tool is in any particular position and the downward movement of the tool from that point may be read directly in thousandths of an inch.

The wear on the tool is most conveniently determined by measuring the length of the tool before and after the grading operation. As the tool 20 is lifted to the same position by every actuation of the handle 75, the wear may be conveniently measured by determining the variation in the position of the bottom or work-engaging end of the tool between successive operations. One form of indicating device for performing this measurement comprises a plate 88 mounted on the lower end of a rod 89 (Figs. 1 and 5). The rod is mounted to slide vertically in a block 90 and is provided with a slot to engage the end of a lever 91 pivoted on the block at 92. The other end of the lever is provided with a gear segment 93 which engages a pinion 94 having a frictional connection with a pointer 95 movable over a dial 96 which is also mounted on the block 90. By this construction the up and down movements of the plate 88 are indicated in greatly increased amplitude by the pointer 95. The dial 96 is provided with suitable graduations, preferably being the same as those employed on the dial 82, that is, thousandths of an inch.

The operation of the machine, which is also an exemplification of the preferred sequence of steps in the practice of the method, is as follows:—

The work W is put on the table 10, the table being raised or lowered by manipulation of the hand wheel 13 to bring the upper surface of the wheel to the desired height. When the work is put into the machine the tool is preferably in its elevated position into which it is moved by operation of the handle 75. The wheel being in place the tool is now lowered, by means of the handle, until it rests upon the work. If the tool is to be given a preliminary seating movement upon the wheel this is done by means of the hand wheel 65. After the tool has been turned in contact with the wheel sufficient to seat itself it is again lifted by means of the handle 75 for the purpose of making an initial measurement to determine the length of the tool before the wheel is graded. The tool 20 is raised from the position shown in Fig. 1 to that shown in Fig.

5 and the indicating device is moved to the right on the rods 97 so that the plate 88 lies below the tool. The plate will have to be lowered from the position shown in Fig. 1 so as to pass below the tool and then lifted again into firm contact with the bottom of the tool. The pointer 95 is then moved over the dial 96 to indicate zero, the parts now being in the position indicated in Fig. 5. The indicating device is then moved into its inoperative position out of the way of the tool.

The tool is then lowered onto the work in the same position, of course, in which it was when the tool was preliminarily seated, and the pointer 83 is turned, which is permitted by its frictional connection with the shaft, so as to indicate zero. The position of all the parts is as shown in Fig. 1. The machine is now thrown into operation by means of the handle 40 which throws the clutch into driving condition and the tool commences to rotate upon the wheel under the pressure of the weights 60. As soon as the clutch is thrown, it is locked in driving position, as has been described, by the latch 44 until the machine is automatically stopped by the counting mechanism. The counting mechanism operates as has been hereinbefore described to throw out the clutch, which leaves the parts in the position indicated diagrammatically in Fig. 6, which shows the tool 20 as having penetrated the work W, and the tool has, of course, been worn off somewhat in so doing. The pointer 83 indicates the total downward movement of the shaft 23 which represents the penetration of the tool into the work and the wear on the tool. This total indication may be, for example, 25 as shown in this figure.

In order to separate this indication of 0.025" into its component parts of tool wear and penetration, the tool is again measured to determine how much has been worn therefrom in the grading operation. This second measurement of the tool is performed in a similar manner to that described for the initial measurement; that is, the tool is lifted by an operation of the handle 75 and the indicator mechanism is moved forward into operative relation with the tool. In the example used for the purpose of illustration, the pointer 95 as shown in Fig. 7 indicates 20 which, assuming that the graduations of the dial are in thousandths of an inch, indicates that the tool has lost 0.020" in length through the abrasive action of the wheel thereon.

In order to obtain the penetration of the wheel it has been found to be most expedient to substract the tool wear from the combined wear and penetration which is, in the example, to subtract 20 from 25, the remainder 5 being the penetration of the wheel.

We have in this manner determined two numerals which have a positive and known relation to the characteristics of the wheel. These two numerals, 5 and 20 for instance, may be marked directly on the wheel which would indicate to the user that the ratio of the cutting action on the grading tool to the wear on the wheel, under certain known conditions, was in the ratio of 20 to 5. It is possible, however, to use a single character, such as a letter of the alphabet, to indicate the characteristics of the wheel as determined by our method. For this purpose the numerals ascertained, that is 5 and 20, may be compared by the use of a suitable chart with a series of known standards, and by this means the letter indicating the characteristics determined by the penetration and tool wear may be selected.

It is obvious that this invention is applicable to grading various bodies of the nature of stone which are capable of causing wear or abrasion on the tool and preferably permitting appreciable penetration by the tool, and the claims which specify an abrasive article or body are to be thus broadly interpreted. The nature and scope of the present invention having been indicated and the preferred embodiment of the invention and the method of practicing the invention having been specifically described, what is claimed as new is:

1. The method of grading an article of bonded abrasive grains which comprises relatively moving a wearable tool and said article in contact through an extensive circular path and thereby abrading the tool by the action of successive abrasive grains, simultaneously feeding the tool forward under a definite pressure, continuing said relative movement for a definite period and until a measurable reduction in tool size has been produced, and measuring the combined amounts of wear upon the article and the tool produced by such abrasion.

2. The method of grading an abrasive article which comprises forcing a wearable tool into the article under a definite pressure while moving the tool and the article relative to each other and measuring the extent of wear of the tool and the extent of its penetration into the article.

3. The method of grading an abrasive article comprising moving a wearable abrading tool against the article for a definite period and under a fixed pressure, measuring the extent of wear of the tool and the penetration into the article and comparing these measurements with data similarly obtained with standard articles to determine a grade marking for the ungraded article.

4. The method of grading an abrasive article comprising cutting into the article by rotating a wearable tool thereagainst for a definite period and under a constant pressure, measuring the extent of wear of the tool and the penetration into the article, and comparing these measurements with data similarly obtained with standard articles to determine a grading marking for the ungraded article.

5. The method of grading an abrasive article comprising the steps of causing a tool to rotate a definite number of turns and under a definite pressure against the article and determining the wear on the tool and the penetration into the article.

6. The method of comparatively grading abrasive bodies, comprising the steps of causing a tool to rotate under uniform conditions against each of the abrasive bodies to be compared, measuring the movement of the tool toward the body as it penetrates the body and is worn thereby, measuring the length of the tool to determine its decrease in length and then subtracting the wear of the tool from the combined penetration and tool wear to determine the penetration.

7. A machine for determining the comparative grade of abrasive bodies, having in combination means for supporting a body, a wearable tool, means for relatively rotating the tool and the abrasive body to cause the tool to cut into the body under uniform conditions, and means comprising a member mounted on the machine and movable into operative relation with the tool for determining the wear thereon.

8. A machine for determining the grade of abrasive bodies having, in combination, means for supporting a body, a wearable tool, means for rotating the tool frictionally against the abrasive body under uniform conditions and means movable into operative relation with the tool for determining the wear thereon and the penetration of the tool into the body.

9. A machine for determining the grade of abrasive bodies having in combination, means for supporting a body, a tool, a driving mechanism including a clutch for rotating the tool against the body, automatic means for throwing the clutch to limit the duration of the operation and means for determining a characteristic of the body as indicated by the tool.

10. A machine for determining the grade of abrasive bodies having, in combination, means for supporting a body, a tool, a driving mechanism by which the tool is rotated in abrading contact with the body, means for automatically disconnecting the tool from the driving mechanism after a predetermined number of revolutions, and an indicating device comprising a scale on which a characteristic of the body is indicated in accordance with the action of the tool.

11. A machine for determining the grade of abrasive bodies having, in combination, a support for the body, a tool, means for causing an abrading action between the tool and the body, means for measuring the combined penetration of the tool into the body and the wear on the tool in so doing and means for measuring the wear on the tool.

12. A machine for determining the grade of abrasive bodies having, in combination, a support for the body, a tool, power actuated means for rotating the tool, means for applying a constant but adjustable pressure on the tool, a counting mechanism including means to disconnect the power after a predetermined rotation of the tool, and means for measuring the penetration and the wear of the tool.

13. A machine for determining the grade of abrasive bodies, having, in combination, a support for the body, a tool, means for rotating the tool against the body whereby the tool penetrates the same, an indicator to measure the movement of the tool in penetrating the body and an indicator to measure the wear of the tool by the body.

14. A machine for determining the grade of abrasive bodies having, in combination, a support for the body, a tool, power actuated means for rotating the tool, a clutch connecting the power and the actuating means, a counting mechanism, connections between the counting mechanism and the clutch by which the driving connection to the tool is disconnected in accordance with the setting of the counting mechanism, an indicator to measure the movement of the tool toward the body, means for positively moving the tool away from the body and an indicator movable into operative position beneath the tool to measure the difference in length thereof caused by the abrasive action of the body.

15. A machine for determining the grade of abrasive bodies, having in combination, means for supporting the body, a rotatable tool having no bearing against the body at the intersection of the axis of rotation of the tool and the adjacent surface of the body, means for rotating the tool against the body under uniform conditions and means for measuring the difference in length of the tool caused by the abrasive action between the tool and the body.

16. A machine for determining the grade of abrasive bodies, having in combination, a hollow cylindrical tool, means for holding the tool against the body under uniform conditions, means for rotating the tool about its longitudinal center line, and means for measuring the difference in length of the tool caused by the abrasive action between the tool and the body.

17. A machine for determining the grade of abrasive bodies, having in combination, a hollow cylindrical tool provided with a plurality of generally longitudinal slots in its work-engaging end, means for holding the tool against the body under uniform conditions, means for rotating the tool about its longitudinal center line, and means for measuring the decrease in size of the tool resulting from the abrasive action between the tool and the body.

Signed at Worcester, Massachusetts, this 18th day of Jan., 1919, and this 31 day of January, 1919.

CHARLES J. HUDSON.
WILSON C. BROGA.